May 26, 1953 E. T. ABLE ET AL Re. 23,661
SOCKET WRENCH EXTENSION
Original Filed July 14, 1949 2 Sheets-Sheet 1
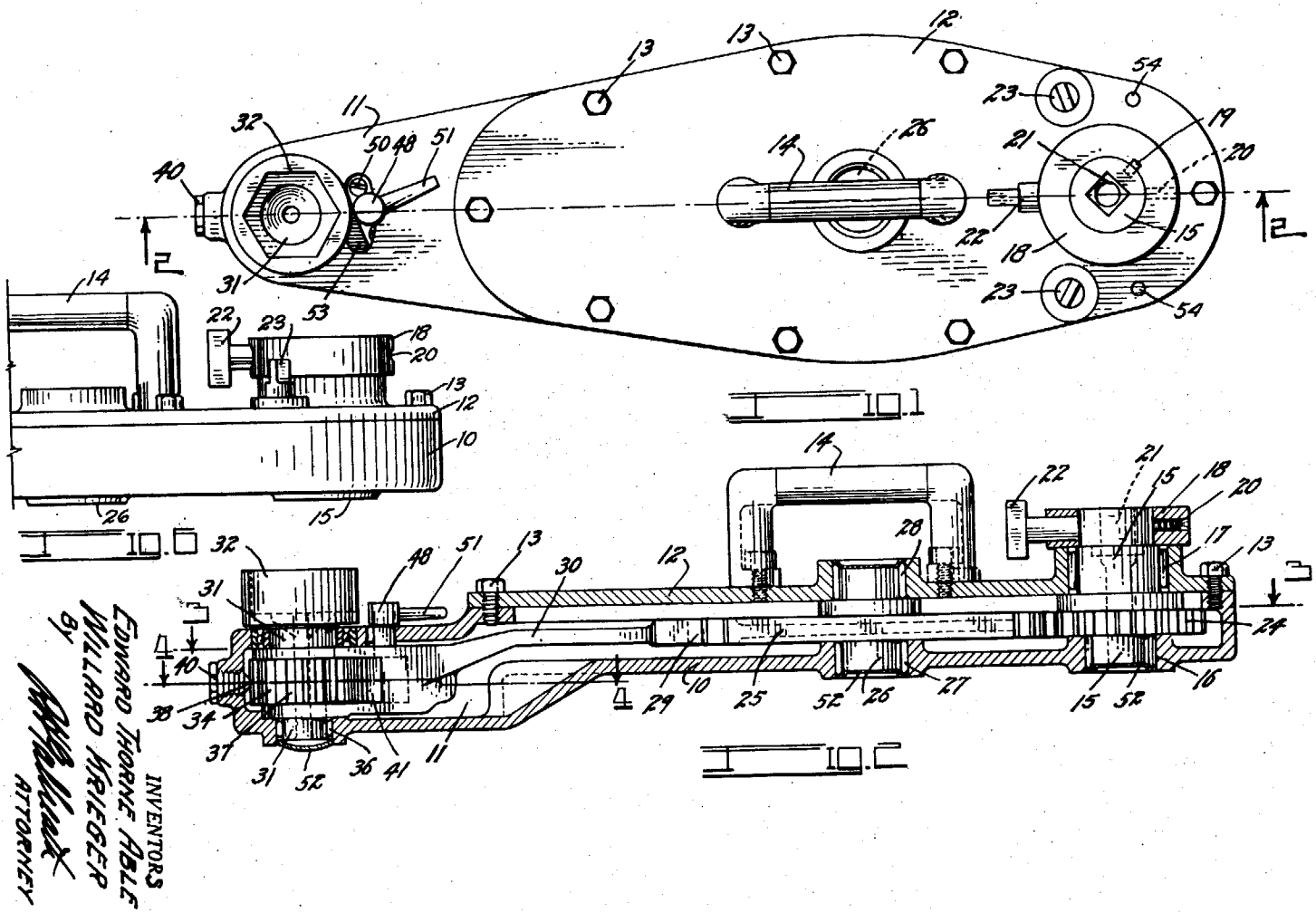
INVENTORS
EDWARD THORNE ABLE
WILLARD KRIEGER
By
ATTORNEY May 26, 1953 E. T. ABLE ET AL Re. 23,661
SOCKET WRENCH EXTENSION
Original Filed July 14, 1949 2 Sheets-Sheet 2
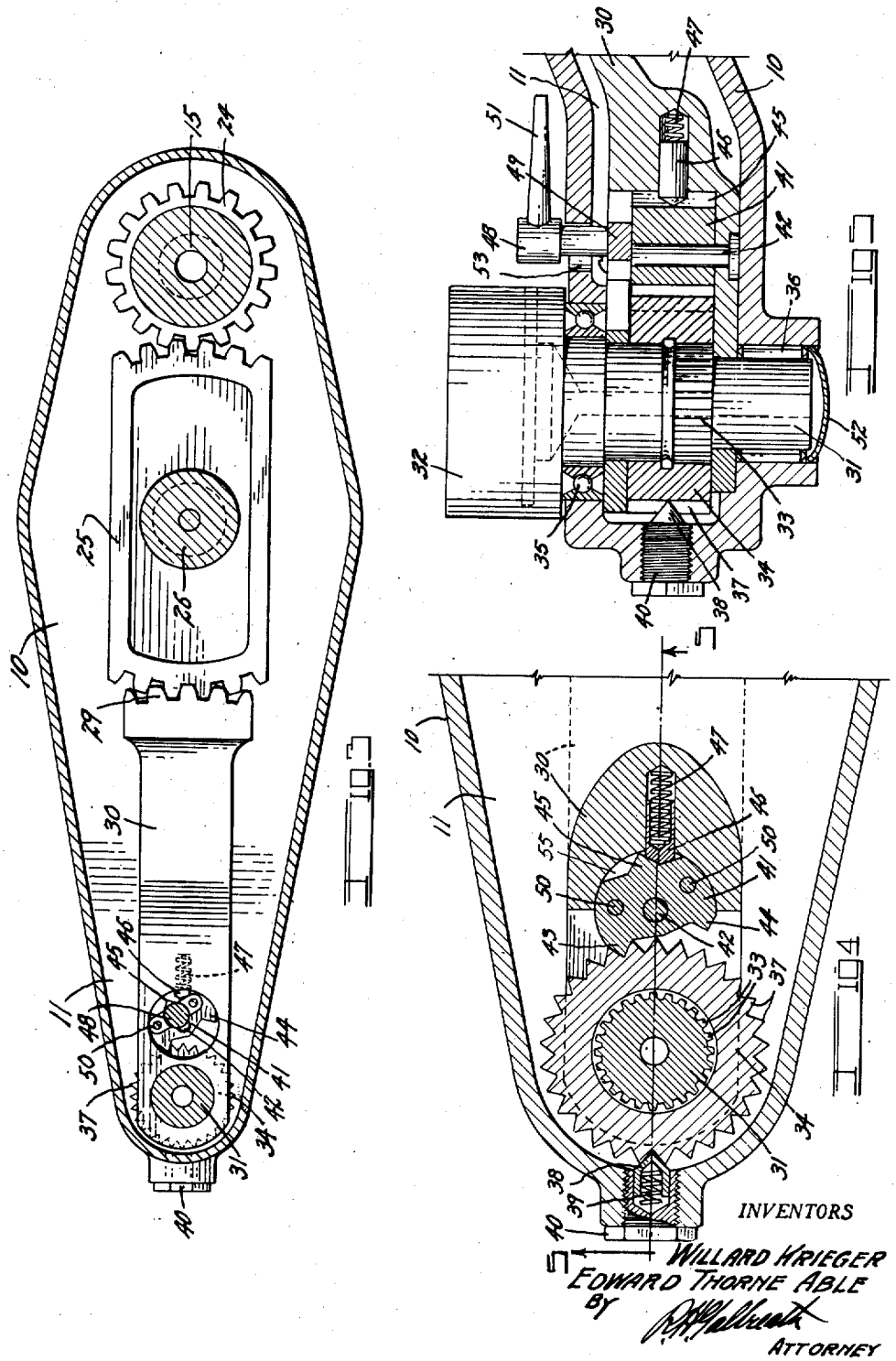
INVENTORS
WILLARD KRIEGER
EDWARD THORNE ABLE
BY
ATTORNEY Reissued May 26, 1953

Re. 23,661

UNITED STATES PATENT OFFICE 23,661

SOCKET WRENCH EXTENSION

Edward Thorne Able and Willard Krieger, Denver, Colo., assignors to B. K. Sweeney Mfg. Co., Denver, Colo., a corporation of Colorado Original No. 2,600,177, dated June 10, 1952, Serial No. 104,644, July 14, 1949. Application for reissue October 8, 1952, Serial No. 313,817

11 Claims. (Cl. 81—57)

Matter enclosed in heavy brackets [ ] appears in the original patent but forms no part of this reissue specification; matter printed in italics indicates the additions made by reissue.

This invention relates to a socket wrench extension device, more particularly designed for use in reaching and rotating the main bearing nuts on diesel engine crank shafts. In the usual large diesel engine, as employed in locomotive work, the crank cases are accessible only through relatively small doors in the side of the crank case. It is exceedingly difficult to reach and rotate the nuts on the main bearings through these side doors, due to the fact there is not sufficient space below the nuts to operate a conventional socket wrench, and there is not sufficient width in the doors to swing the usual lever-type wrench.

The principal object of this invention is to provide a socket wrench extension device which can be readily inserted through a crank case door of a locomotive type diesel engine, and easily positioned over the main bearing nuts therein, and which can be actuated from the exterior of the crank case.

Another object of the invention is to so construct the wrench extension device that the torque effort exerted on the external extremity thereof will be greatly multiplied at the wrench extremity thereof.

A further object is to provide a highly efficient ratcheting mechanism whereby the nuts may be rapidly and easily rotated in either desired direction by a simple oscillating motion at the outer extremity.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a top view of the improved socket wrench extension device;

Fig. 2 is a vertical, longitudinal section therethrough, taken on the line 2—2, Fig. 1;

Fig. 3 is a horizontal, longitudinal section, taken on the line 3—3, of Fig. 2;

Fig. 4 is an enlarged, fragmentary, detail section, taken on the line 4—4, Fig. 2;

Fig. 5 is similarly an enlarged, detail section, taken on the line 5—5, Fig. 4; and Fig. 6 is a fragmentary side view of the outer extremity of the improved socket wrench extension device.

The improved wrench is designed to present a relatively flat cross-section so that it may be readily inserted in the limited vertical spaces available in the conventional locomotive diesel crank case. The wrench mechanism is enclosed in an elongated flat housing 10 having a ratchet chamber 11 adjacent its inner extremity.

The remainder of the housing 10 is closed by means of a removable cover plate 12 held in place thereon by suitable cap screws 13. The [cap] *cover* plate 12 is provided with a convenient carrying handle 14 positioned adjacent the outer extremity of the housing 10 so as to facilitate the insertion of the inner extremity thereof into the crank case.

A vertical, hollow power shaft 15 is journalled in suitable anti-friction bearings 16 in the housing 10 and in suitable bearings 17 in the cover plate 12 adjacent the outer extremity of the wrench. A set collar 18 is keyed, as indicated at 19, to the upper extremity of the power shaft 15, and is set thereon by means of a suitable set screw 20 so that the collar will rotate it as a unit with the shaft 15. The shaft is provided with a noncircular wrench socket 21 for receiving the plug extremity of any suitable wrench device, by means of which the power shaft 15 can be rotated.

The arc of rotation of the power shaft 15 is limited by means of a stop arm 22 which is affixed in and projects from the collar 18 so as to swing into contact with stop pins 23 mounted on the cover plate 12 at the limits of the arc of movement.

A toothed drive pinion 24 is formed or permanently mounted on the power shaft 15 within the housing 10 and is in constant mesh with the teeth of one segment of a double-segment intermediate gear 25. The intermediate gear 25 is mounted on an intermediate gear shaft 26 journalled in anti-friction bearings 27 in the housing 10 and in similar bearings 28 in the cover plate 12. The teeth of the opposite segment of the double-segment intermediate gear 25 are in constant mesh with teeth 29 of a gear segment formed on the free extremity of an actuating lever arm 30. The other extremity of the lever arm 30 is transversally and horizontally slotted and is hingedly mounted on a removable wrench socket shaft 31 carrying at its upper extremity a nut socket 32 for receiving and engaging the faces of the nut or bolt to be rotated.

The wrench socket shaft 31 is formed with a plurality of external splines 33 which intermesh with spline grooves formed in a ratchet gear 34 which is mounted on the socket shaft 31 within the transverse slot in the hinged extremity of the [operating] lever *arm* 30.

The shaft 31 is journalled in suitable ball bearings 35 in the top of the ratchet chamber 11 and in suitable anti-friction radial bearings 36 in the bottom thereof. The ratchet gear 34 moves as a unit with the socket shaft 31.

A plurality of ratchet teeth 37 are formed in the periphery of the ratchet gear 34. The ratchet teeth 37 are double acting[,] that is, they are pointed with equally and oppositely inclined sides forming a plurality of 90° V-shaped grooves in its periphery.

Rotation of the ratchet gear 34 is resisted by means of a pointed, tubular ratchet click 38 which is constantly urged into the notches between the teeth 37 by means of a click spring 39. The click 38 and its spring 39 are mounted in a removable plug 40 threaded into the extremity of the housing 10.

The oscillations of the lever arm 30 are transmitted to the ratchet gear 34 by means of a generally circular rocking ratchet pawl 41 mounted in a cylindrical pawl cavity 55 in the arm 30. A pawl pin 42 extends concentrically through the cavity 55 and through the pawl 41 to retain the latter in its cavity.

The rocking pawl 41 is provided with front and rear faces defining parallel chords of its circular periphery. The front face is provided with a right-hand tooth 43 at one side and a left-hand tooth 44 at the other side. The pawl 41 and the pin 42 are so positioned that the teeth 43 and 44 can be alternately brought into engagement with the notches between the ratchet teeth 37 by simply swinging the pawl back and forth.

The pawl may be swung by means of a reversing post 48 having a foot portion 49 which is attached to the top of the pawl 41 by means of suitable attachment screws 50. A pawl-reversing lever 51 projects from the post 48 by means of which it may be rotated.

The rear face of the ratchet pawl 41 is provided with a central holding tooth 45 having equal and oppositely inclined sides. A spring-actuated holding plunger 46 is constantly urged against the rear face of the pawl 41 and against the sides of the tooth 45 by means of a plunger spring 47.

Let us assume that the improved socket wrench extension device has been inserted through the side door of a diesel engine crank case and is resting upon the lower edge of the door opening, with the [wrench] *nut* socket 32 extending upwardly about a main bearing nut, and that it is desired to tighten the said nut. The reversing lever 51 is swung to the right, causing the plunger 46 to snap over the holding tooth 45 and against the left side thereof, as shown in Fig. 4. This brings the right-hand tooth 43 into contact with the ratchet teeth 37. A turning bar or actuating lever is now inserted in the wrench socket 21 and swung back and forth, the actuating arc being limited by the position of the stop pins 23. The drive pinion 24 oscillates one extremity of the intermediate gear 25. The other extremity of the latter will oscillate the free extremity of the actuating lever arm 30. As this arm moves clockwise, the pawl 41 will be carried with it and will tend to rotate clockwise about the pin 42, causing the tooth 43 to climb and snap over the teeth 37. As the tooth 43 climbs the teeth of the ratchet gear, the holding tooth acts against the plunger 46 and compresses the spring 47. The click 38 prevents the ratchet wheel from rotating with the return movement of the pawl.

As the [actuating] *lever* arm 30 swings counter-clockwise the pawl 41 tends to rotate in the same direction about the pin 42 and [faces] *forces* the tooth 43 into the notch between the teeth 37 so as to force the ratchet gear 34 to the right, causing the click 38 to ride over the ratchet teeth. The rotation of the ratchet gear 34 is transmitted through the splines 33 to the nut socket 32, and from thence to the nut in place therein.

To unscrew the nut, it is only necessary to swing the reversing lever 51 to the left to place the left-hand tooth 44 in contact with the teeth [47] *37* and to place the holding plunger 46 on the opposite side of the central holding tooth 45.

It will be noted that a multiplied torque is obtained proportional to the difference in pitch radius between the drive pinion 24 and the actuating lever arm 30. The stop pins 23 are so positioned that the arc of movement of the intermediate gear 25 will be limited to the confines of the housing 10. Dowel pins 54 are provided in the housing 10 which enter receiving openings in the cover plate 12 to facilitate the positioning of the latter over the various shafts in the housing 10.

The socket shaft 31 can be simply lifted from place and replaced by others to suit the particular nuts being worked upon.

It is desired to call attention to the fact that the pawl 41 is generally circular and that it fits snugly into the cylindrical [socket] *pawl cavity* 55 so that the reactive thrust of the pawl is absorbed by the wall of the [socket] *pawl cavity* 55, and not by the pin 42. Therefore, much greater stresses can be sustained than would be accommodated by the cross-section of the pin 42.

While a specific form of the improvement has been described and illustrated herein, it is to be understood that the same may be varied, within the scope of the appended claims without departing from the spirit of the invention.

Having thus described the invention, what is claimed and desired secured by Letters Patent is:

1. An extension wrench device comprising: an elongated housing; a power shaft provided with a wrench-receiving socket mounted in the outer extremity of said housing; a wrench shaft provided with a nut-receiving socket mounted in the inner extremity of said housing; a toothed drive pinion fixedly mounted on said power shaft; a lever arm of greater length than width rotatably mounted on said wrench shaft and projecting to one side only of the latter; an intermediate gear positioned between said pinion and the free extremity of said lever arm within said housing and in mesh with said drive pinion; teeth on the free extremity of said lever arm in mesh with said intermediate gear so that oscillation of said power shaft will be transmitted through said intermediate gear to said lever arm; and means transmitting the oscillation of said lever arm to said wrench shaft.

2. An extension wrench device comprising: an elongated housing; a power shaft provided with a wrench-receiving socket mounted in the outer extremity of said housing; a wrench shaft provided with a nut-receiving socket mounted in the inner extremity of said housing; a toothed drive pinion fixedly mounted on said power shaft; a lever arm of greater length than width rotatably mounted on said wrench shaft and projecting to one side only of the latter; an intermediate gear positioned between said pinion and the free extremity of said lever arm within said housing and in mesh with said drive pinion; teeth on the free extremity of said lever arm in mesh with said intermediate gear so that oscillation of said power shaft will be transmitted through said intermediate gear to said lever arm; a ratchet gear affixed on said wrench shaft; and a ratchet pawl mounted in an opening formed in said lever arm adjacent said ratchet gear and acting against said ratchet gear to transmit the oscillation of said lever arm into rotation of said wrench shaft.

3. An extension wrench device comprising: an elongated housing of greater length than width; a power shaft provided with a wrench-receiving socket mounted in the outer extremity of said housing; a wrench shaft provided with a nut-receiving socket mounted in the inner extremity of said housing; a toothed drive pinion fixedly mounted on said power shaft; a lever arm of greater length than width rotatably mounted on said wrench shaft and projecting to one side only of the latter; an intermediate gear position between said pinion and the free extremity of said lever arm within said housing and in mesh with said drive pinion; teeth on the free extremity of said lever arm in mesh with said intermediate gear so that oscillation of said power shaft will be transmitted through said intermediate gear to said lever arms; a ratchet gear affixed on said wrench shaft; a ratchet pawl mounted in an opening formed in said lever arm adjacent said ratchet gear and acting against said ratchet gear to transmit the oscillation of said lever arm into rotation of said wrench shaft, the width of said housing acting to limit the arc of movement of said lever arm to less than 360°.

4. An extension wrench device comprising: an elongated housing of greater length than width; a power shaft provided with a wrench-receiving socket mounted in the outer extremity of said housing; a wrench shaft provided with a nut-receiving socket mounted in the inner extremity of said housing; a toothed drive pinion fixedly mounted on said power shaft; a lever arm of greater length than width rotatably mounted on said wrench shaft and projecting to one side only of the latter; an intermediate gear positioned between said pinion and the free extremity of said lever arm within said housing and in mesh with said drive pinion; teeth on the free extremity of said lever arm in mesh with said intermediate gear so that oscillation of said power shaft will be transmitted through said intermediate gear to said lever arm; a ratchet gear affixed on said wrench shaft; a ratchet pawl rotatably mounted in said lever arm and engaging said ratchet gear to transmit movement from said lever arm to said wrench shaft, said intermediate gear having a greater length than width so as to correspond to the shape of the elongated housing, the width of said housing limiting the arc of rotation of said intermediate gear to less than 360°.

5. An extension wrench device comprising: an elongated housing of greater length than width; a power shaft provided with a wrench-receiving socket mounted in the outer extremity of said housing[,]; a wrench shaft provided with a nut-receiving socket mounted in the inner extremity of said housing; a toothed drive pinion fixedly mounted on said power shaft; a lever arm of greater length than width rotatably mounted on said wrench shaft and projecting to one side only of the latter; an intermediate shaft in said housing intermediate said wrench shaft and said power shaft; a relatively narrow, double-segment, intermediate gear of greater length than width mounted on said intermediate shaft, the segments of said gear extending in opposite aligned directions, the drive pinion being in mesh with one of said segments; teeth on the free extremity of said lever arm in mesh with the other of said segments so that oscillation of said power shaft will be transmitted through said intermediate gear to said lever arm; and ratchet means mounted on said lever arm for rotating said ratchet gear in consequence of the oscillation of said lever [arms] *arm*, the width of said housing being insufficient to allow complete rotation of said intermediate gear.

6. An extension wrench device comprising: an elongated housing of greater length than width; a power shaft provided with a wrench-receiving socket mounted in the outer extremity of said housing; a wrench shaft provided with a nut-receiving socket mounted in the inner extremity of said housing; a toothed drive pinion fixedly mounted on said power shaft; an intermediate shaft in said housing; an intermediate gear of greater length than width rotatably mounted on said intermediate shaft in mesh at one extremity with said drive gear; an elongated lever arm; teeth in one extremity of said lever arm in mesh with the opposite extremity of said intermediate gear; a shaft opening in the other extremity of said lever arm axially parallel to said drive and intermediate shafts, the latter extremity of the lever arm being slotted in a plane at right angles to the axis of said shaft opening; a wrench shaft passing through and rotatable within said opening; a ratchet gear keyed on said wrench shaft within the slot in said lever arm; means journalling said wrench shaft in said housing; and ratchet means mounted on said lever arm and engaging said ratchet gear to rotate the latter in consequence of oscillation of said lever arm the width of said housing being insufficient to allow complete rotation of said intermediate gear and said lever arm.

7. An extension wrench device comprising: an elongated, relatively flat housing; a hollow power shaft journalled in said housing and extending therethrough adjacent one extremity of the latter and at right angles to the plane thereof; means on said power shaft limiting the rotation thereof to a predetermined arc; a toothed drive pinion affixed on said power shaft within said housing; an intermediate, opposed, double-segment gear rotatably mounted in said housing with one segment in mesh with said drive pinion; a wrench socket shaft rotatably mounted in, and extending through, said housing adjacent the other extremity thereof; a ratchet gear affixed on said wrench socket shaft within said housing; and actuating lever *arm*, one extremity of said lever *arm* being bifurcated to receive said ratchet gear, and being hingedly connected with said socket shaft on both sides of said ratchet gear, the other extremity of said lever arm being in mesh with the other segment of said double-segment gear; double-acting, peripheral ratchet teeth on said ratchet gear; a reversible ratchet pawl mounted in, and movable with, said actuating lever *arm* and contacting said teeth; and pawl-reversing means mounted on said pawl and extending to the exterior of said housing.

8. An extension wrench device as described in claim 7 in which the wrench socket shaft is axially withdrawable from the ratchet gear for interchange purposes, and having means for slidable engagement between said socket shaft and said ratchet gear for communicating the rotation of the latter to the former.

*9. An extension wrench device comprising: an elongated housing; a power shaft provided with a wrench-receiving socket mounted in the outer extremity of said housing; a wrench shaft provided with a nut-receiving socket mounted on the inner extremity of said housing; a drive opinion fixedly mounted on said power shaft; a lever arm of greater length than width including the segment of a gear rotatably mounted on said wrench shaft and projecting to one side only of the latter; tooth-engaging means transmitting movement from said drive pinion to said lever arm so that said lever arm will oscillate in consequence of oscillation of said power shaft; a ratchet gear affixed on said wrench shaft; a ratchet pawl mounted in said lever arm and acting against said ratchet gear to transmit the oscillation of said lever arm into rotation of said wrench shaft, said wrench shaft passing rotatably through a shaft opening in one extremity of said lever arm, said latter extremity having a slot positioned at right angles to the axis of said shaft opening, said ratchet gear being positioned within said slot and having double-acting ratchet teeth thereon, said pawl being reversibly mounted in said lever arm and being movable with the latter into contact with said teeth; and pawl-reversing means mounted on said pawl and extending to the exterior of said housing.*

*10. An extension wrench device as defined in claim 9 in which the wrench shaft is axially withdrawable from the ratchet gear for interchange purposes, and having means for transmitting rotation from said wrench shaft to said ratchet gear.*

*11. An extension wrench device comprising: an elongated housing; a power shaft provided with a wrench-receiving socket mounted in the outer extremity of said housing; a wrench shaft provided with a nut-receiving socket mounted on the inner extremity of said housing; a drive pinion fixedly mounted on said power shaft; a lever arm of greater length than width including the segment of a grear rotatably mounted on said wrench shaft and projecting to one side only of the latter, said drive pinion being operatively associated with said segment of a gear so that said lever arm oscillate in consequence of oscillation of said power shaft; a ratchet gear affixed on said wrench shaft; a ratchet pawl mounted in said lever arm and acting against said ratchet gear to transmit the oscillation of said lever arm into rotation of said wrench shaft, said wrench shaft passing rotatably through a shaft opening in one extremity of said lever arm, said latter extremity having a slot positioned at right angles to the axis of said shaft opening, said ratchet gear being positioned within said slot and having double-acting ratchet teeth thereon, said pawl being reversibily mounted in said lever arm and being movable with the latter into contact with said teeth; and pawl-reversing means mounted on said pawl and extending to the exterior of said housing.*

EDWARD THORNE ABLE.
WILLARD KRIEGER.

References Cited in the file of this patent or the original patent

UNITED STATES PATENTS

| Number | Name | Date |
|---|---|---|
| 350,479 | Clement | Oct. 12, 1886 |
| 603,156 | Spengler | Apr. 26, 1898 |
| 1,057,598 | Van Der Werff | Apr. 1, 1913 |
| 1,511,151 | Wilson | Oct. 7, 1924 |
| 1,957,462 | Kress | May 8, 1934 |
| 1,970,721 | Walton | Aug. 21, 1934 |

FOREIGN PATENTS

| Number | Country | Date |
|---|---|---|
| 338,340 | France | May 16, 1904 |
| 7,697 | Great Britain | July 29, 1909 |